United States Patent
Toumayan et al.

(10) Patent No.: US 9,280,783 B2
(45) Date of Patent: Mar. 8, 2016

(54) SYSTEM AND METHOD FOR PROVIDING CUSTOMIZED ON-LINE SHOPPING AND/OR MANUFACTURING

(75) Inventors: Samuel G. Toumayan, St. Louis, MO (US); John L. McMullin, III, St. Louis, MO (US); Paul Lewis, Dardenne Prairie, MO (US); Aaron Eversoll, O Fallon, MO (US)

(73) Assignee: Meridian Enterprises Corporation, Hazelwood, MO (US)

( * ) Notice: Subject to any disclaimer, the term of this patent is extended or adjusted under 35 U.S.C. 154(b) by 451 days.

(21) Appl. No.: 12/729,507

(22) Filed: Mar. 23, 2010

(65) Prior Publication Data

US 2011/0238484 A1 Sep. 29, 2011

(51) Int. Cl.
*G06Q 30/00* (2012.01)
*G06F 17/30* (2006.01)
*G06Q 30/02* (2012.01)
*G06Q 30/06* (2012.01)

(52) U.S. Cl.
CPC ............ *G06Q 30/0239* (2013.01); *G06Q 30/02* (2013.01); *G06Q 30/0621* (2013.01); *G06Q 30/0641* (2013.01)

(58) Field of Classification Search
CPC .................................................. G06Q 30/0239
USPC ............................................... 705/26.1–27.2
See application file for complete search history.

(56) References Cited

U.S. PATENT DOCUMENTS

| | | | |
|---|---|---|---|
| 6,298,348 B1 | 10/2001 | Eldering | |
| 6,327,574 B1 | 12/2001 | Kramer et al. | |
| 6,343,274 B1 | 1/2002 | McCollom et al. | |
| 6,360,254 B1 * | 3/2002 | Linden et al. | 709/219 |
| 6,581,072 B1 | 6/2003 | Mathur et al. | |
| 6,615,247 B1 | 9/2003 | Murphy | |
| 6,694,365 B1 * | 2/2004 | Wyngarden | 709/225 |
| 6,782,370 B1 | 8/2004 | Stack | |
| 6,853,982 B2 | 2/2005 | Smith et al. | |
| 6,868,392 B1 | 3/2005 | Ogasawara | |
| 6,868,395 B1 | 3/2005 | Szlam et al. | |
| 6,895,387 B1 | 5/2005 | Roberts et al. | |
| 7,069,271 B1 | 6/2006 | Fadel et al. | |
| 7,162,451 B2 | 1/2007 | Berger et al. | |
| 7,200,568 B2 | 4/2007 | Dodd | |
| 7,219,070 B2 | 5/2007 | Antonello et al. | |

(Continued)

OTHER PUBLICATIONS

Steinberg, Jesse, and Joseph Pasquale. "A web middleware architecture for dynamic customization of content for wireless clients." Proceedings of the 11th international conference on World Wide Web. ACM, 2002.*

*Primary Examiner* — Kathleen Palavecino
(74) *Attorney, Agent, or Firm* — Woodard, Emhardt, Moriarty, McNett & Henry LLP

(57) ABSTRACT

A system and method for providing a customized on-line shopping interface and/or manufacturing is disclosed. The system uses customer's computer, location, URL, IP address, email domain, embedded promotion code, or other predetermined criteria to provide special product offerings and pricing for a particular class or subclass of customers. If an unauthorized user attempts to access the system, a series of screens containing non-customized pricing is presented to the intruder so as not to alert the intruder that he or she has reached the restricted content. Based on the authentication information, automated manufacturing processes and equipment may be utilized to produce the customized products.

18 Claims, 2 Drawing Sheets

(56) References Cited

U.S. PATENT DOCUMENTS

| | | |
|---|---|---|
| 7,222,085 B2 | 5/2007 | Stack |
| 7,249,067 B2 | 7/2007 | Doerksen et al. |
| 7,370,004 B1 | 5/2008 | Patel et al. |
| 7,376,588 B1 | 5/2008 | Gregov et al. |
| 7,594,605 B2 * | 9/2009 | Aaron et al. .................. 235/380 |
| 7,689,627 B2 * | 3/2010 | McAfee ........................ 707/783 |
| 2001/0042002 A1 | 11/2001 | Koopersmith |
| 2002/0059395 A1 | 5/2002 | Liou |
| 2002/0107756 A1 | 8/2002 | Hammons et al. |
| 2004/0204979 A1 | 10/2004 | Eisenberg et al. |
| 2006/0167759 A1 | 7/2006 | Fedele |
| 2006/0235721 A1 | 10/2006 | Kavanagh et al. |
| 2007/0043626 A1 | 2/2007 | Duvall et al. |
| 2008/0201242 A1 | 8/2008 | Minis et al. |
| 2009/0150985 A1 * | 6/2009 | Chan et al. ........................ 726/8 |
| 2009/0257591 A1 * | 10/2009 | Mithal et al. .................. 380/252 |
| 2010/0106540 A1 * | 4/2010 | Reasoner .......................... 705/7 |
| 2011/0126002 A1 * | 5/2011 | Fu et al. ........................ 713/156 |
| 2011/0191831 A1 * | 8/2011 | Chan et al. ........................ 726/4 |

* cited by examiner

SYSTEM AND METHOD FOR PROVIDING CUSTOMIZED ON-LINE SHOPPING AND/OR MANUFACTURING

TECHNICAL FIELD OF THE DISCLOSURE

The present disclosure relates to electronic commerce and, more specifically, to systems and methods for customizing a shopping interface for a particular customer or class of customers without the need for the customer to enter information into the interface. The present disclosure also relates to automated and/or custom manufacturing of products for a particular customer or class of customers.

BACKGROUND OF THE INVENTION

In recent years, the prevalence of online shopping websites has increased dramatically. Many manufacturers and resellers which operate such websites occasionally offer discounts directed to a certain class of customers. However, the manufacturers may not want their other customers or competitors to become aware of the special discounts being offered. It is therefore desirable to restrict access to the special pricing information to those customers that have been selected to receive the discount.

Known methods for determining which customers are accessing a website generally require the customer to manually input a username and/or password. If the username and password are compromised, unauthorized individuals may gain access to the sensitive pricing information. Other methods, such as the use of browser "cookies," require the user to enable cookies on their browser, a step many users are unwilling or unable take, as cookies are typically considered a privacy risk. Still other security measures may be employed, such as the use of digital certificates or other encryption keys, however these measures may be difficult or frustrating for users to implement, thereby discouraging the use of an online shopping website.

The manufacturers and resellers may also have problems determining the specific product customizations that are appropriate for a given class of customers and, more particularly, conveying such information to the manufacturing facility or distribution center for each unit of product purchased. There is therefore a need for systems and methods which provide a more secure, yet convenient, shopping experience for the user and a more streamlined manufacturing and/or distribution process for the provider. The present application fills this need.

SUMMARY OF THE INVENTION

According to one aspect, a system for providing customized online shopping is disclosed, comprising a web server for communicating with an external client computer, said web server containing computer readable code for presenting a customized online shopping interface; wherein said computer readable code is configured to generate first product information for display on said external client computer upon the authentication of a user; wherein said authentication is based on at least one of a referring IP address, a referring URL, an email domain and an embedded promotion code contained in a request sent from the external client computer to the web server; and wherein said computer readable code is configured to generate second product information for display on said external client computer when an unauthorized user is detected.

According to another aspect, a method for providing customized online shopping is disclosed, comprising the steps of receiving an HTTP request, said HTTP request containing a referring IP address, a referring URL, an email domain and an embedded promotion code; evaluating at least one of the referring IP address, the referring URL, the email domain and the embedded promotion code to determine if a user is authorized for access to a customized online shopping interface; presenting the user with first product information based on at least one of the referring IP address, the referring URL, the email domain and the embedded promotion code if the user is determined to be authorized for access; and presenting the user with second product information if said evaluating step determines that the user is not authorized; wherein an authorized user is not required to manually enter any identification information to gain access to the customized online shopping interface.

According to yet another aspect, a device is disclosed, comprising a computer readable medium, said computer readable medium containing computer executable code for generating a customized online shopping interface; wherein said computer executable code is configured to generate said customized online shopping interface according to a method comprising the steps of receiving an HTTP request, said HTTP request containing a referring IP address, a referring URL, an email domain and an embedded promotion code; evaluating at least one of the referring IP address, the referring URL, the email domain and the embedded promotion code to determine if a user is authorized for access to the customized online shopping interface; presenting first product information to the user based on at least one of the referring IP address, the referring URL, the email domain and the embedded promotion code if the user is determined to be authorized for access; and presenting the user with second product information if said evaluating step determines that the user is not authorized; wherein an authorized user is not required to manually enter any identification information to gain access to the customized online shopping interface.

DETAILED DESCRIPTION OF THE PREFERRED EMBODIMENTS

Figure 1:
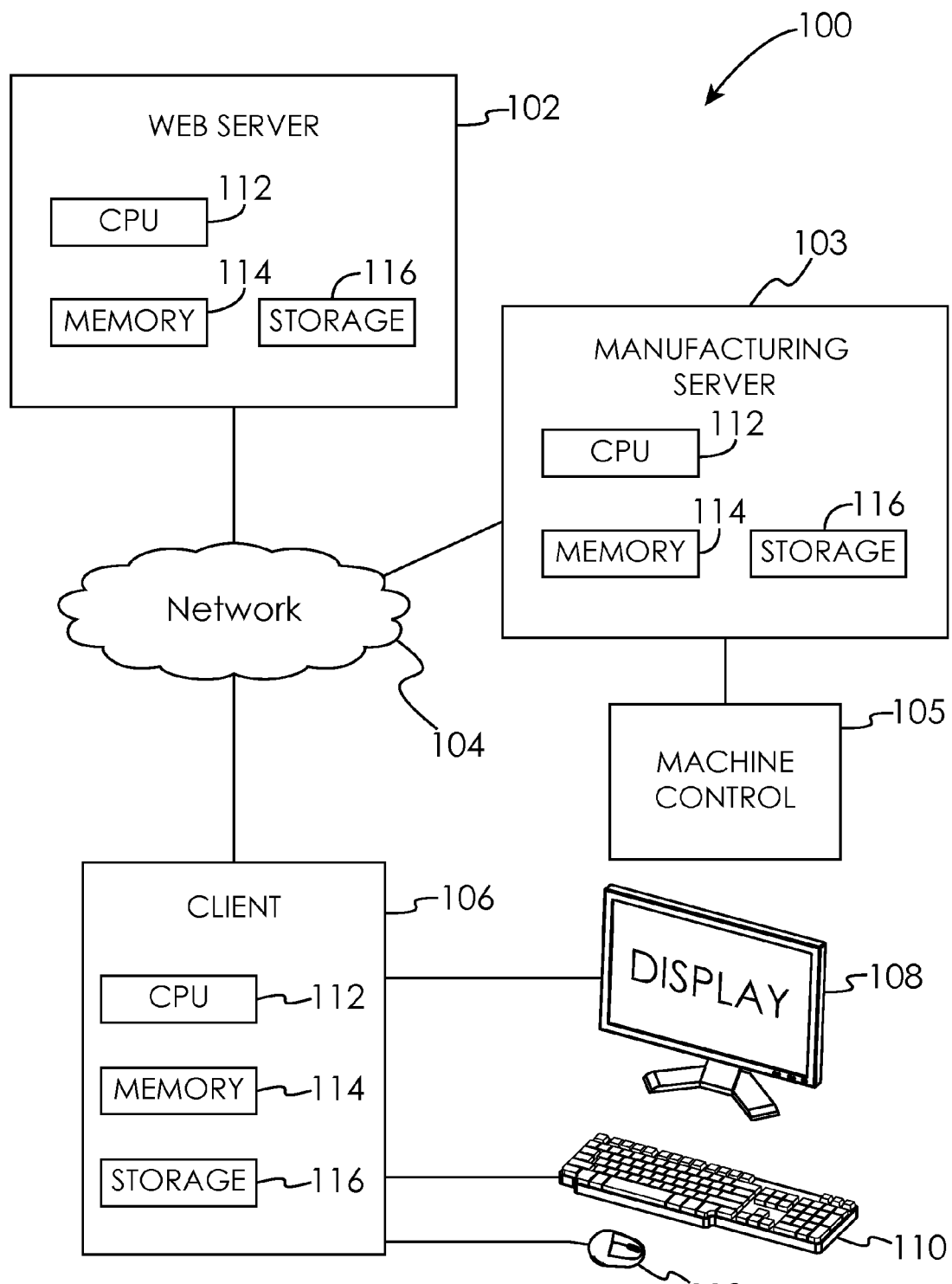
FIG. 1 is a schematic block diagram of a system for providing customized on-line shopping according to one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present disclosure relates to the use of a referring Uniform Resource Locator (URL), a referring Internet Protocol (IP) address, an email domain, an embedded promotion code, a computer physical location, or other predetermined criteria to recognize and customize the shopping interface for a particular customer or class of customers without the customer entering any information into the interface. The system allows a company to offer product discounts to certain classes of retail customers on a website without alerting other classes of customers (i.e., business-to-business or wholesale buyers) of the special discounts being offered. Other customizations may be implemented based on the user profile including, but not limited to, specific model availability, overall interface look and feel, and special terms and conditions related to the sale. No browser cookies or other intrusive measures are required to identify the user's status for purposes of receiving discounts or customized product offerings.

If an unauthorized user is detected, the system will report and track the intrusion, but will go ahead and present a normal shopping interface with non-customized pricing. This prevents unauthorized users from being alerted that they are being shut out of a "protected" portion of the system, which might otherwise encourage them to try harder to gain access. The system tracks and reports all authorized and unauthorized access, including the reason that users were denied or allowed access.

The disclosed embodiments eliminate the need for ongoing maintenance of data related to individual employees. When an employee leaves a company, there is no need to remove the employee's name from a database in the online shopping system if the discount for that company is based on employee status. For example, the employee would no longer be accessing the shopping site from his or her work computer and therefore the referring IP address or URL would no longer match that of the employer web server.

The disclosed system also eliminates the need for Payment Card Industry (PCI) standards compliance in cases where payment for the purchased items is not made using the user's own credit card (e.g., when the employer is billed directly for the employee user's purchases).

The system also allows customized pricing to be set up in a hierarchical fashion, with various subsets. For example, the subsets can be based on classes of employees in a company or brands within a store. The Manufacturer's Suggested Retail Price (MSRP) of a product can be changed, whereby the discounted pricing for all of the various customized interfaces will automatically be updated.

FIG. 1 shows a schematic block diagram of a system according to one embodiment of the present disclosure. System 100 includes web server 102, manufacturing server 103, network 104, machine control 105, client 106, display 108, and user input devices such as keyboard 110 and mouse 112. These devices are coupled to the client 106 to access customized product information from the server computer 102 and display the information for the user on display 108.

The web server 102 and manufacturing server 103 may be implemented on a rack-mountable or blade server, a personal computer, a workstation computer, a laptop computer, a palmtop computer, or the like. It will be apparent to those of ordinary skill in the art that other computer system architectures may also be employed.

In general, each of the web server 102 and manufacturing server 103 comprise a bus for communicating information, a processor 112 coupled with the bus for processing information and a memory 114 coupled to the bus for storing information and instructions for the processor 112. A mass storage interface for communicating with a data storage device 116 containing digital information may also be included in each of the web server 102 and manufacturing server 103 as well as a network interface for communicating with a the network 104.

The processors 112 may be any of a wide variety of general purpose processors or microprocessors such as the PENTIUM microprocessor manufactured by INTEL Corporation, a POWER PC manufactured by IBM Corporation, a SPARC processor manufactured by Sun Corporation, or the like. It will be apparent to those of ordinary skill in the art, however, that other varieties of processors may also be used in a particular computer system.

The memory 114 may include one or more types of solid-state electronic memory, magnetic memory, or optical memory, just to name a few. By way of non-limiting example, memory 114 may include solid-state electronic Random Access Memory (RAM), Sequentially Accessible Memory (SAM) (such as the First-In-First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM). Also, memory 114 may be volatile, nonvolatile, or a hybrid combination of volatile and nonvolatile varieties.

The mass storage interface may allow the processors 112 access to the digital information contained within the digital storage devices 116 via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 116 may be a conventional hard disk drive, a floppy disk drive, a flash device (such as a jump drive or SD card), an optical drive such as a compact disc (CD) drive, digital versatile disc (DVD) drive, HD DVD drive BLU-RAY disc drive, or another magnetic, solid state, or optical data storage device, along with the associated medium (a floppy disk, a CD-ROM, a DVD, etc).

It shall be understood that the processors 112 may be comprised of one or more components configured as a single unit. Alternatively, when in multi-component form, a processor 112 may have one or more components located remotely relative to the others. One or more components of each processor 112 may be of the electronic variety defining digital circuitry, analog circuitry, or both.

Client 106 may be implemented using any of the computer architectures described above in relation to web server 102 and manufacturing server 103. Client 106 may further be implemented using a wireless terminal having computing capabilities, such as a mobile phone having a Windows CE or Palm operating system, an iPhone™ or the like. Client 106 may also comprise a processor 112, memory 114, mass storage interface, bus, network interface and storage devices 116 as described hereinabove in relation to web server 102 and manufacturing server 103.

The display 108 is coupled to the communication bus of client 106 for displaying information for a user and the input devices 110, 112 are coupled to the bus for communicating information and command selections to the processor 112. The display 108 may comprise a liquid crystal display (LCD), a cathode ray tube (CRT), a plasma monitor, an organic light emitting diode (OLED) display, or other suitable display device. Using the display 108, the user is able to view information regarding various goods for sale with customized pricing for the class of customers to which the user belongs.

In general, the processor 112 retrieves processing instructions and data from the data storage device 116 using the mass storage interface and downloads this information into random access memory for execution. The processor 112 then executes an instruction stream from random access memory or read-only memory. Command selections and information that is input at input devices 110, 112 are used to direct the flow of instructions executed by the processor 112. The results of this processing execution are then displayed on display device 108.

Web server 102, manufacturing server 103, and client 106 are able to communicate via network 104. Network 104 may comprise a Local Area Network (LAN), a Wide Area Network (WAN), or the internet.

Manufacturing server 103 may be operatively connected to machine control 105 to enable the automated manufacturing or distribution of particular physical goods. Machine control 105 may comprise various types of manufacturing control equipment such as programmable logic controllers (PLCs), Supervisory Control and Data Acquisition (SCADA), Remote Terminal Units (RTUs), and other machine controls known in the art. Machine control 105 is operatively connected to the manufacturing and/or distribution equipment (not shown) which physically creates, assembles, or retrieves the customized goods in response to orders placed by the user via client 106. It shall be appreciated by those of ordinary skill in the art that machine control 105 may be implemented as an integral component within the manufacturing server 103 or as a separate unit.

Figure 2:
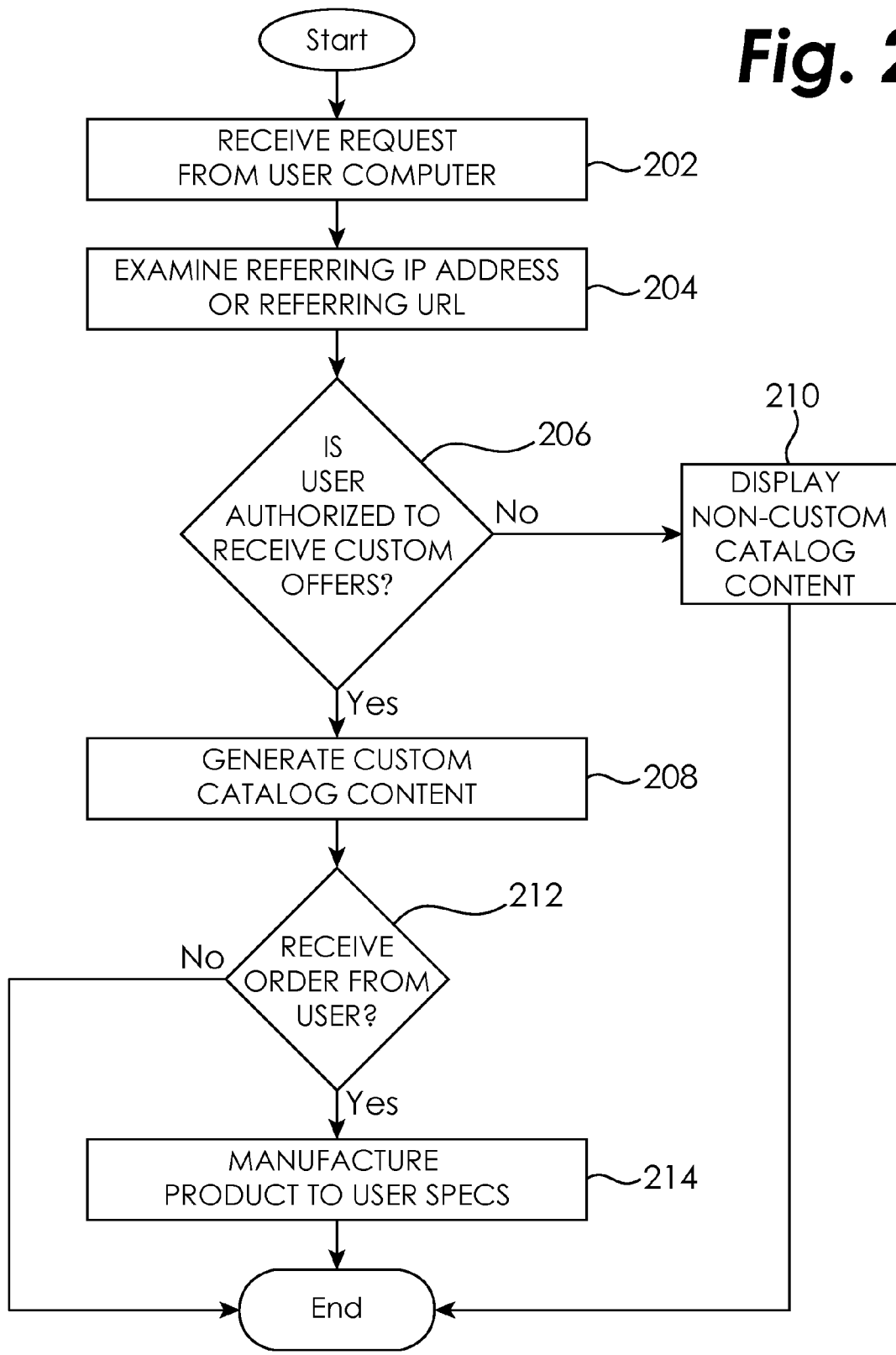
FIG. 2 is a schematic flow diagram of a method for providing customized on-line shopping according to one embodiment of the present disclosure.

FIG. 2 illustrates a process for customizing an on-line shopping interface according to one embodiment of the present disclosure. The process starts at step 202 when the web server 102 receives a request from the client 106. The request may be sent when the user enters a URL link, also known as a "web address," into a web browser program on client 106. The URL link contains the address of a customized webpage with special pricing and product offerings based on a particular class of customers. In certain embodiments, the URL link may be provided to the user as a hyperlink within an email or on an intranet website, wherein the user simply clicks on the URL link as opposed to manually typing the URL link into the web browser address bar. The request is typically in the form of a hyper text transfer protocol (HTTP) request, but other types of requests containing an embedded URL link are contemplated to be within the scope of the disclosure.

Once the web server 102 has received the client request, it examines the information contained in the HTTP request headers at step 204, including the referring internet protocol (IP) address and the referring URL. The web server 102 executes software to determine whether the user is authorized to view the desired pricing and product information. In one embodiment, the user is authenticated based on the referring IP address contained in the message header. That is, only users whose requests originate from a particular IP address may be allowed access to the content. In other embodiments, the referring URL is used to authenticate the user. In still further embodiments, a combination of both the referring IP address and referring URL are used to authenticate the user. It shall be understood that other criteria may be used to automatically authenticate the user including, but not limited to, the geolocation of the user client computer 106 or the name or network id of the user. For example, geolocation may be achieved by automatically looking up the referring IP address in a WHOIS database to determine the physical location of the registrant. Additionally, the user's network id or name may be contained in the transmitted HTTP request if the user's employer or network administrator has granted access to the its internal network identification by exposing its Lightweight Directory Access Protocol (LDAP) library to the web server 102.

Still other types of identification may be used to authenticate the user. For example, the email domain of the user may be extracted from the HTTP request headers. The email domain is typically listed in the HTTP "From" request header, although the present disclosure contemplates that other request header fields may be used which contain the email domain information. In still other embodiments, an embedded coupon code contained in the HTTP header information may be extracted and used to authenticate the user. For example, the coupon code can be contained within the referring URL or other header information to identify which types of discounts or customized product offerings the user is qualified to receive.

At step 206, the web server 102 evaluates the authentication information of the user. If the web server 102 determines that the user is in the class of customers who are authorized to view the customized catalog information, it generates the custom product and pricing content information for the particular customer class at step 208. As used herein, the term "generate" shall be interpreted to include the retrieval of pricing and product content with or without a real-time computation or determination of the prices and products to be displayed. The product information is then displayed for the user on display 108 in an HTML web page or other appropriate format. In this way, the user is able to view customized products and/or special pricing without having to first enter a username and/or password. For example, if all of the employees who work for a certain company are to be given a particular discount on products, the IP address of the company's main internet router may be registered with the vendor offering the discount. Whenever an employee accesses a designated vendor web page using a computer on the employer's internal network (with the employee's computer sending a request to the vendor web server 102), the employee will have the instant ability to view the customized products and/or pricing without having to enter a login name or password. At the same time, the vendor is protected from unauthorized users gaining access to the restricted pricing and product information.

In addition to price and model, the offered products may contain further customizations based on the received user IP address, referring URL, email domain or embedded coupon code. Certain products, such as computers or other electronics, may be built to the customer's specifications based on a previous arrangement between the employer company and the product vendor. For example, a desktop computer manufacturer may agree to use parts from a certain supplier whenever employees of the supplier order computers from that manufacturer. Other products, such as clothing, may be manufactured with a specific company logo for any employee of that company who placed an order for the clothing. In addition, the terms and conditions for sale, including return policies or shipping and handling methods, may be customized based on the identity or class profile of the user.

The overall look and feel of the shopping interface screens presented to the user may also be customized based on the user profile. For example, if the products being offered are automotive parts, the background colors and on-screen controls may be tailored to appeal to automotive enthusiasts. As another example, a company logo may be displayed on the shopping interface.

The above-mentioned customizations may be implemented as a hierarchy, with different levels and sublevels based on the user profile. For example, a first level of customization may be implemented for all employees of a certain employer, with further customizations implemented depending on the department or seniority level of each employee. In other embodiments, a certain level of discount may be offered for all products being offered through the online shopping interface, with separate additional discounts applied to various products depending on the manufacturer of each product.

If the web server 102 determines that the user does not have permission to access the custom product offerings at step 206, the process proceeds to step 210 where non-custom catalog content is generated, routed to the client 106, and displayed to the user with standard pricing and product offerings. Because the unauthorized user sees a seemingly normal shopping screen with standard pricing, as opposed to a warning or other rejection screen, they will believe they have successfully penetrated the security measures and will likely stop trying to gain further access. Additional screens may be built into the system which will continue to present non-customized content if the unauthorized user attempts to further navigate from the initial non-customized screen. As the unauthorized user continues to be presented with non-customized content pages, the desire to find restricted content is thereby diminished. Activity logs may be maintained to determine and track attempts by unauthorized users to access the restricted content. In certain embodiments, a notification can be sent to the system administrator as soon as an unauthorized user attempts to access the system. In other embodiments, the log of unauthorized access attempts for a given time period may be periodically sent to the administrator.

At step 212, the authenticated user is able to place an order for a particular product being displayed. In certain embodiments, the system 100 may be configured to require the user to enter additional security information, such as a username or password, in addition to payment information (i.e., credit card numbers) before actually placing an order. In other embodiments, the user may be allowed to order products without entering any additional information, wherein an invoice for payment may be sent directly to the employer. For example, the employer may have already agreed to provide payment for company shirts or uniforms bearing the company logo when ordered from employer computers.

At step 214, the web server 102 optionally sends a request to the manufacturing server 103 containing the information about the product ordered by customer. The manufacturing server 103, in conjunction with machine control 105, initiates the automated production or retrieval of the product. In certain embodiments, the specifications for a particular user may be stored within the manufacturing server 103 prior to receiving the product order. For example, a user's shirt size, favorite color, or other product preference may be entered in the system to simplify the ordering process for the user and to more fully automate the manufacturing process.

In certain embodiments, the manufacturing server 103 operates machine control 105 to manufacture or customize the product in real time (i.e., add custom stitched logos on clothing, assemble an electronic device, manufacture a custom length golf club), thereby reducing inventory requirements. In other embodiments, the manufacturing server 103 and machine control 105 may operate distribution equipment to select a specific pre-manufactured item from a warehouse facility, after which it can be shipped to the customer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A computer-implemented method for providing a customized online shopping interface, comprising the steps of:

using a server having a processor, receiving an HTTP request from a remote user computer over a network, said HTTP request including one or more request headers containing at least one of a referring IP address and an email domain;

evaluating, with the processor, at least one of the referring IP address and the email domain from said one or more request headers in said HTTP request to determine if a user is authorized for access to the customized online shopping interface;

in response to determining that the user is authorized for access, using the server computer, transmitting a first product information to the remote user computer over the network, the first product information based on at least one of the referring IP address and the email domain; and in response to determining that the user is not authorized, using the server computer, transmitting a second product information to the remote user computer over the network;

wherein an authorized user is not required to manually enter any identification information to gain access to the customized online shopping interface.

2. The method of claim 1, wherein said first product information is customized based on at least one of the referring IP address and the email domain; and wherein said second product information is not customized.

3. The method of claim 2, wherein the request headers further contain a user identifier; and wherein said first product information is further customized based on the user identifier.

4. The method of claim 3, wherein said user identifier is retrieved from an LDAP directory.

5. The method of claim 1, wherein the request headers include a request header containing a referring URL, and wherein both the referring IP address and the referring URL are evaluated to determine if the user is authorized for access.

6. The method of claim 1, wherein said evaluating step further comprises:

determining a physical location associated with said referring IP address; and using said physical location as a factor in determining whether said user is authorized for access.

7. The method of claim 1, further comprising the steps of:

receiving a request from a user for a product listed in said customized online shopping interface; and manufacturing the product in response to receiving said request.

8. The method of claim 7, wherein the product is manufactured according to specifications based on at least one of the referring IP address and the email domain.

9. The method of claim 1, wherein an unauthorized user is presented with a plurality of successive interface screens containing non-customized product information.

10. The method of claim 1, where said first product information comprises selective pricing discounts based on at least one of the referring IP address and the email domain.

11. The method of claim 1, wherein said first product information comprises selected product models based on at least one of the referring IP address and the email domain.

12. A device comprising a non-transitory computer readable medium, said non-transitory computer readable medium containing computer executable code for generating a customized online shopping interface;

wherein: said computer executable code is configured to generate said customized online shopping interface according to a method comprising the steps of:

receiving an HTTP request, said HTTP request including one or more request headers containing at least one of a referring IP address and an email domain;

evaluating at least one of the referring IP address and the email domain from said one or more request headers in said HTTP request to determine if a user is authorized for access to the customized online shopping interface;

presenting first product information to the user based on at least one of the referring IP address and the email domain if the user is determined to be authorized for access; and presenting the user with second product information if said evaluating step determines that the user is not authorized;

wherein an authorized user is not required to manually enter any identification information to gain access to the customized online shopping interface.

13. The device of claim 12, wherein said first product information is customized based on at least one of the referring IP address and the email domain; and wherein said second product information is not customized.

14. The device of claim 13, wherein the request headers further contain a user identifier; and wherein said first product information is further customized based on the user identifier.

15. The device of claim 13, wherein said user identifier is retrieved from an LDAP directory.

16. The device of claim 12, wherein said computer executable code is further configured to present an unauthorized user with a plurality of successive interface screens containing non-customized product selections.

17. The device of claim 12, where said first product information comprises selective pricing discounts based on at least one of the referring IP address and the email domain.

18. The device of claim 12, wherein said first product information comprises selected product models based on at least one of the referring IP address and the email domain.

* * * * *